United States Patent [19]

Ogura et al.

[11] Patent Number: 4,965,871

[45] Date of Patent: Oct. 23, 1990

[54] CONTINUOUS PLURAL PAGE COPYING METHOD FOR A COPIER

[75] Inventors: Masaaki Ogura, Kawasaki; Kiyotaka Ohta, Soka; Junji Kurokawa, Yokohama; Masaji Ito, Ageo; Toshiaki Hayasaka, Tokyo, all of Japan

[73] Assignee: Ricoh Company, Ltd., Tokyo, Japan

[21] Appl. No.: 213,252

[22] Filed: Jun. 29, 1988

[30] Foreign Application Priority Data

Jun. 30, 1987 [JP] Japan .............................. 62-163588

[51] Int. Cl.[5] .............................................. G03B 27/52

[52] U.S. Cl. ......................................... 355/55; 355/57

[58] Field of Search .................................... 355/55–57, 355/243

[56] References Cited

U.S. PATENT DOCUMENTS 4,714,944 12/1987 Yoshiura ............................ 355/243

4,783,682 11/1988 Maehara ............................... 355/57

*Primary Examiner*—L. T. Hix

*Assistant Examiner*—D. Rutledge

*Attorney, Agent, or Firm*—Oblon, Spivak, McClelland, Maier & Neustadt

[57] ABSTRACT

A continuous plural page copying method for a copier determines the size and lengthwise direction of a document which is laid on a glass platen, and produces magnifications on the basis of a relationship between one half of the size of the document in the lengthwise direction and the size of the papers selected. Consecutive pages of the document are reproduced continuously with no regard to the orientation of the document on the glass platen relative to the scanning direction of a scanner. The method reproduces an image on a paper while desirably matching it to the size of the paper.

4 Claims, 22 Drawing Sheets

| Fig. 21A-1 |
|---|
| Fig. 21A-2 |

CONTINUOUS PLURAL PAGE COPYING METHOD FOR A COPIER

BACKGROUND OF THE INVENTION

The present invention relates to a method of continuously copying a plurality of pages for a copier.

Some medern copiers have various advanced functions such as a variable-magnification copying function and a continuous plural page copying function. The continuous plural page copying function is such that, for example, the left and right pages of a book or like spread document are each reproduced on a different paper. A continuous copying system of the kind described customarily divides images into two in the scanning direction of a scanner and, hence, the orientation of a document available is fixed. Specifically, a prerequisite with such a prior art system is that the lengthwise direction of a document and the widthwise direction of a paper be parallel to the scanning direction of a scanner. Should a document and a paper be not oriented so, the continuous plural page copying function would be inhibited ("WRONG ORIENTATION" or like message) or the resulting copy would lack a part of a desired image. A person, therefore, has to execute such a mode operation with the greatest possible care which increases the mental burden.

SUMMARY OF THE INVENTION

It is therefore an object of the present invention to provide a continuous plural page copying method for a copier which allows a complete copy to be produced with no regard to the orientation of a document on a glass platen.

It is another object of the present invention to provide a generally improved continuous plural page copying method for a copier.

A method of continuously printing a plurality of pages of a document for a copier of the present invention comprises the steps of (a) laying a document on a glass platen of the copier, (b) reading a size of the document on the glass platen, (c) determining a lengthwise direction of the document, (d) calculating one half of the size of the document in the lengthwise direction determined to produce half size data, (e) storing the half size of the document in a memory, (f) executing a reading operation for first copying, (g) determining the end of the reading operation to a point which is associated with the half size data stored in the memory, and (h) executing a reading operation for second copying.

In accordance with the present invention, a continuous plural page copying method for a copier determines the size and lengthwise direction of a document which is laid on a glass platen, and produces magnifications on the basis of a relationship between one half of the size of the document in the lengthwise direction and the size of the papers selected. Consecutive pages of the document are reproduced continuously with no regard to the orientation of the document on the glass platen relative to the scanning direction of a scanner. The method reproduces an image on a paper while desirably matching it to the size of the paper.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
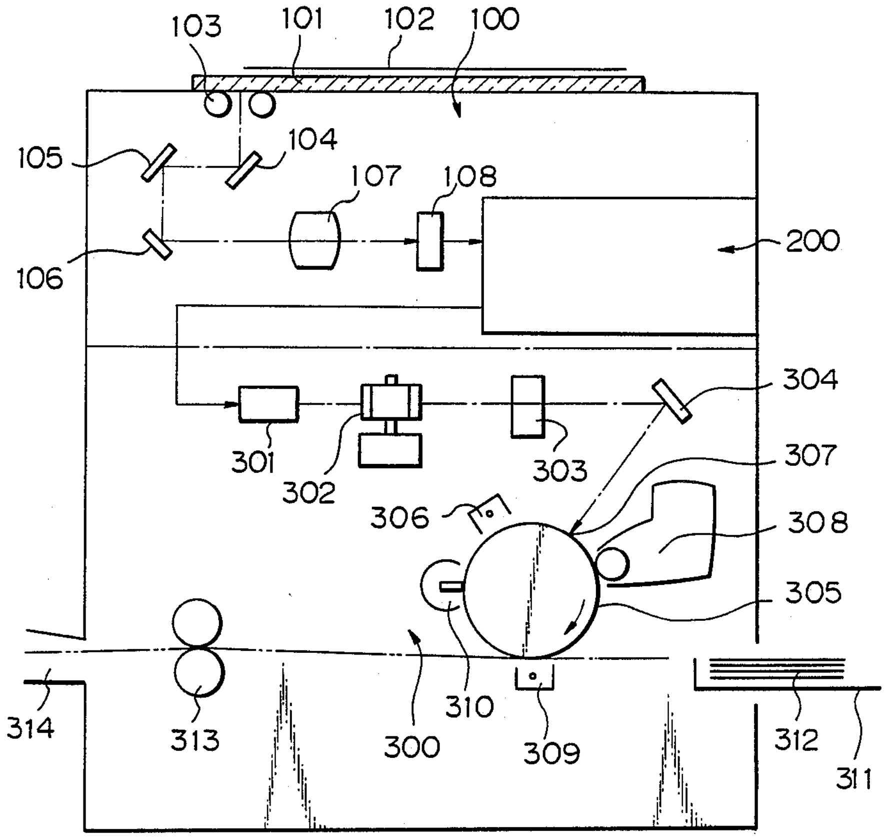
FIG. 1 is a side elevation showing the overall construction of a digital copier to which the present invention is applied.

Referring to FIG. 1 of the drawings, a digial copier to which the present invention is applicable is shown and generally comprised of an image scanner section 100, an image processor section 200, and a printer section 300.

In the image scanner section 100, a lamp 103 illuminates a document 102 which is laid on a glass platen 101 with its image surface facing downward. Light reflected from the document 102 is focused onto a CCD (charge coupled device) image sensor 108 by a first mirror 104, a second mirror 105, a third mirror 106, and a lens 107. While the lamp 103 and first mirror 104 are movable in a reciprocating motion as a first scanner in the right-and-left direction of the figure, the second and third mirrors 105 and 106 are movable as a second scanner in the same direction as and at half the speed of the first scanner.

The imagewise light incident to the CCD image sensor 108 is converted into an electric signal by the image processor section 200 and, in response to key inputs from an operating section, subjected to desired image processing. Consequently, a digital image signal associated with the document image is produced by the image processor section 200.

The digital image signal from the image processor 200 is applied to a semiconductor laser 301 which is included in the printer section 300 so as to modulate a laser beam. The modulated laser beam, or optical signal, scans a photoconductive element 305 via a polygonal mirror 302, an f-theta lens 303, and a mirror 304. The photoconductive element 305 is made of an organic photoconductor having spectral sensitivity to a laser beam, so that a latent image is formed on the element 305 by an electrophotographic process which is well known in the art. Arranged around the photoconductive element 305 are a charger 309, a cleaning unit 310 and the like which in combination implement the electrophotographic process. The resulting toner image provided on the photoconductive element 305 is transferred to a paper 312 which is fed from a paper feed section 311. The paper 312 with the toner image is driven out of the copier via a fixing unit 313 and a discharge section 314.

Figure 2:
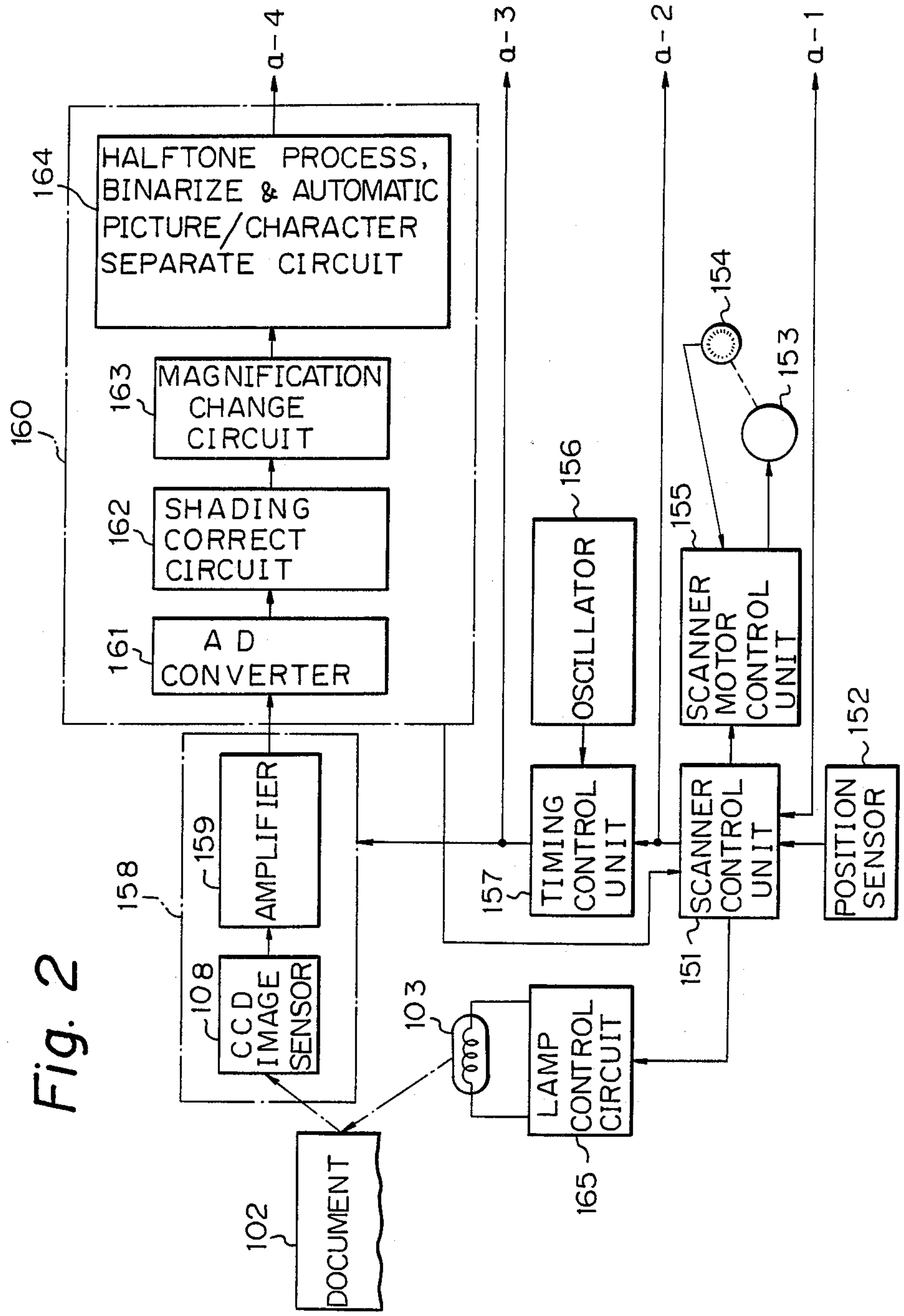
FIG. 2 is a schematic block diagram showing an image reading section.

FIG. 2 shows an arrangement for controlling the image scanner section 100. The major component of the scanner control arrangement shown in FIG. 2 is a scanner control unit 151. A position sensor (home position or HP sensor) 152 and a scanner initialize signal a-1 are coupled to the scanner control unit 151. Also connected to the scanner control unit 151 are a scanner motor control unit 155 to which a scanner motor 153 and an encoder 154 are connected. A timing control unit 157 is connected on one hand to the scanner control unit 151 and on the other hand to an oscillator 156. A lamp control unit 165 associated with the lamp 103 is connected to the scanner control unit 151 for the purpose of on-off controlling the lamp 103 and regulating the quantity of light which issues from the lamp 103. Further, a photoelectric conversion unit 158 is connected to the scanner control unit 151 via a timing control unit 157 and includes an amplifier 159 in addition to the CCD image sensor 108. A signal processing unit 160 is connected to an output of the amplifier 159 and the scanner control unit 151. The signal processing unit 160 is made up of an analog-to-digital (AD) converter 161, a shading correction circuit 162, a magnification change processing circuit 163, and a halftone processing, binarization and automatic picture/character separation circuit 164.

In operation, when a scanner initialize signal a-1 is applied to the scanner control unit 151, the unit 151 determines whether or not the position sensor 152 is operating normally. If it is operating normally, the scanner control unit 151 delivers a command to the scanner motor control unit 155 for driving the scanner motor 153. The scanner motor 153 in turn moves the first scanner, i.e., lamp 103 and first mirror 104 to the left as viewed in FIG. 1. As the position sensor 152 becomes inoperative, the scanner control unit 151 deenergizes the scanner motor 153. Subsequently, the scanner control unit 151 generates a signal for reversing the rotation of the scanner motor 153 with the result that the first scanner is returned to the home position. The timing control unit 157 connected to the oscillator 156 delivers basic timing signals to the photoelectric conversion unit 158 and signal processing unit 160.

How the image of the document 102 is read will be described in detail. Light issuing from the lamp 103 illuminates the image surface of the document 102, and the reflection from the document 102 is incident to the CCD image sensor 108. Since the document 102 is generally white in a major part thereof, the imagewise light incident to the CCD image sensor 108 is intense in a portion corresponding to a white portion of the document 102 and less intense in the other portion corresponding to a black portion of the document 102. Such an optical signal is transformed into an electric signal by the CCD image sensor 108 and then amplified by the amplifier 159 which has an AGC (automatic gain control) function. Specifically, the amplifier 159 with an AGC function serves to maintain the output of the CCD image sensor 108 constant by compensating for the deterioration of the lamp 103, scattering of the amount of light among lamps, contamination of the glass platen 101, mirrors 104, 105 and 106 and lens 107, etc.

The output image signal of the CCD image sensor 108, which is an analog signal, is converted into a digital signal by the AD converter 161 of the signal processing unit 160. The AD converter 161 has to be of a high-speed conversion type (about 15 megahertz) and may be implemented with a flash type converter by way of example. The digital signal outputted by the AD converter 161 is fed to the shading correction circuit 162 to reduce the scattering of output voltage among the bits of the CCD image sensor 108 as well as the scattering among optics. Specifically, the shading correction circuit 162 has a memory having the same number of bits as the CCD image sensor 108 (multi-level data memory), data produced by reading a white reference plate being stored in the memory. If the optics and CCD image sensor 108 are in their ideal conditions, the output of the CCD image sensor 108 will be uniform throughout all the bits. In practice, however, each bit of the CCD image sensor 108 produces a different output due to the various kinds of scattering. Should the data read under such a condition be directly used as image data, the document 102 and the CCD output would differ from each other with respect to the black and white level and therefore would result in an unfaithful printing. In light of this, the output of the CCD image sensor 108 associated with a white reference plate is stored in the memory, and then the output data of the CCD image sensor 108 associated with a document image are processed on the basis of the stored data to produce correct image data. Specifically, assuming that the output associated with a document image is $V_{og}$ and the output associated with the white reference plate is $V_{st}$, the output data S are produced by an equation $S=V_{og}/V_{st}$.

The magnification change circuit 163 is adapted to enlarge or reduce a document image to a desired size, i.e., to change the magnification in the main scanning direction in which the CCD image sensor 108 reads a document image. In this sense, the magnification change circuit 163 serves a horizontal magnification changing means. On the other hand, the magnification is changed in the scanning direction of the optics, i.e., subscanning direction by variably controlling the scanning rate of the optics. This implements vertical magnification changing means. Hence, the magnification is variable in each of the main scanning and subscanning directions as desired.

The halftone processing, binarization and automatic picture/character separation circuit 164 converts multi-level data outputted by the magnification change circuit 163 into two-level data, i.e. black-white data. The multi-level data are representative of pixels each having one of multiple tones. For example, assuming that black data is represented by six-bit data of "000000", white data is represented by "111111" and gray data by "100000". As regards a picture or the like which includes halftone, the multi-level data are converted into two-level data by halftone processing which uses a matrix method, dither method or the like. In the case of a document including both of a picture and characters, halftone processing would blur the characters to make them illegible while binarization would fail to reproduce the halftone of the picture although rendering the characters easy to see. To cope with this dilemmatic situation, the automatic picture/characteristic separation section automatically separates characters and pictures and applies binarization to characters and halftone processing to pictures. In practice, multi-level data may be determined to represent a picture region when a portion including gray or similar halftone continues over a predetermined amount, and to represent a text region when data including definite black and white continues. The resulting signal a-4 is outputted by the processing circuit 164.

Figure 3:
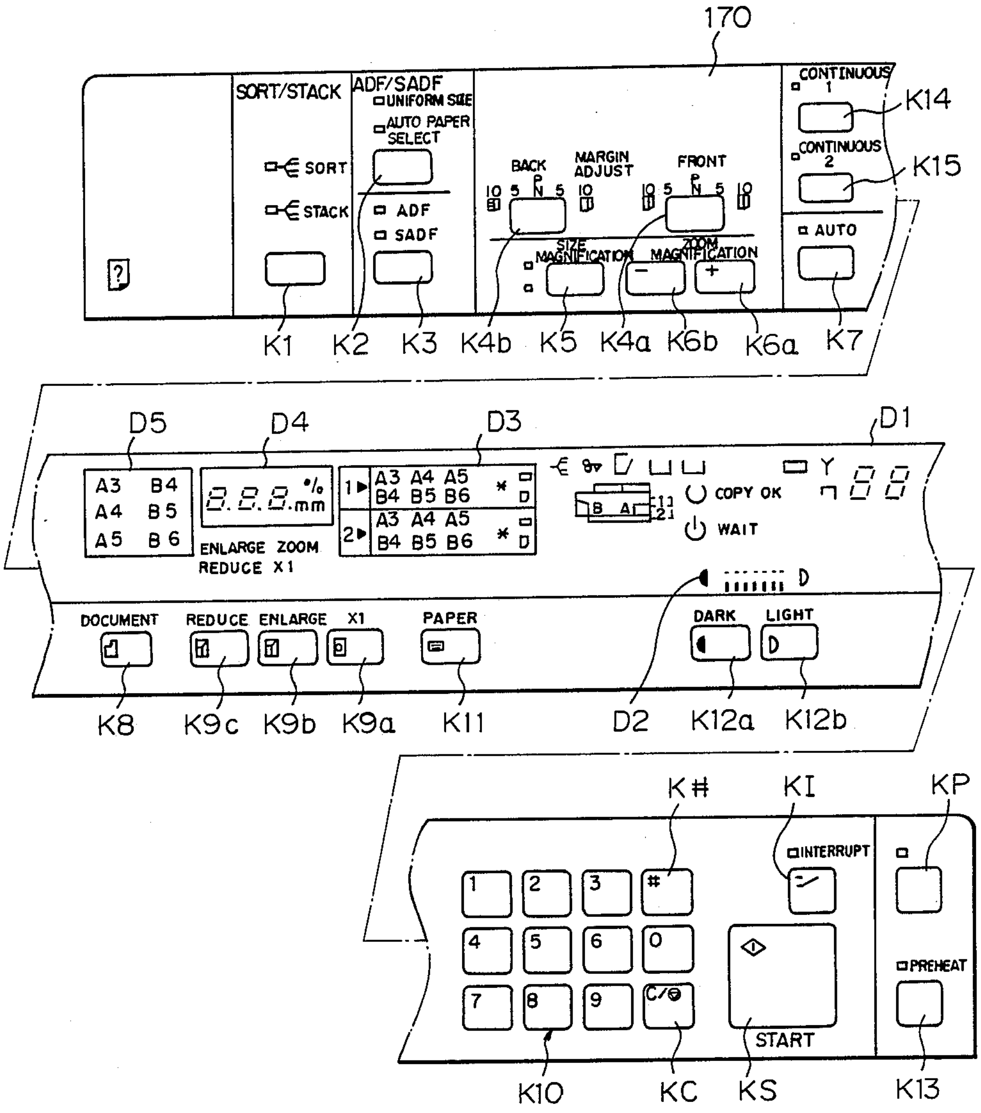
FIG. 3 is a plan view of an operation board.

Referring to FIG. 3, the operation board 170 provided on the copier includes a number of key switches K1, K2, K3, K4*a*, K4*b*, K5, K6*a*, K6*b*, K7, K8, K9*a*, K9*b*, K9*c*, K10, K11, K12*a*, K12*b*, K13, K14, K15, KC, KS, K#, KI and KP, and multiple displays D1, D2, D3, D4 and D5. Major ones of these key switches and displays will be outlined hereunder.

The key switches K6*a*, K6*b*, K9*a*, K9*b* and K9*c* are accessible to specify a magnification. The key switches K8 and K11 are adapted to enter a document size and a desired paper feed section. K10 generally designates numeral keys for entering a desired number of copies and other numerical values. The key switches K12*a* and K12*b* are for selecting copy density. The key switches K14 and K15 may be operated to select a continuous plural page copy mode. The key switch KC is a clear/-stop key for clearing the number of copies entered on the ten keys K10 and interrupting a copying operation. The display D1 is implemented by a seven-segment two-bit numerical display which in an ordinary mode shows the number of copies entered while the copier is in a waiting condition and shows the number of copies produced while it is in operation. The display D2 shows copy density selected. The display D3 displays the sizes of papers each being loaded in a different paper feed section, orientations of the papers, and which of the paper feed sections, is selected. The display D4 is a seven-segment 3-bit numerical display which in a usual operation mode shows magnifications on a 1% basis. Further, the display D5 shows a document size entered.

Figure 4:
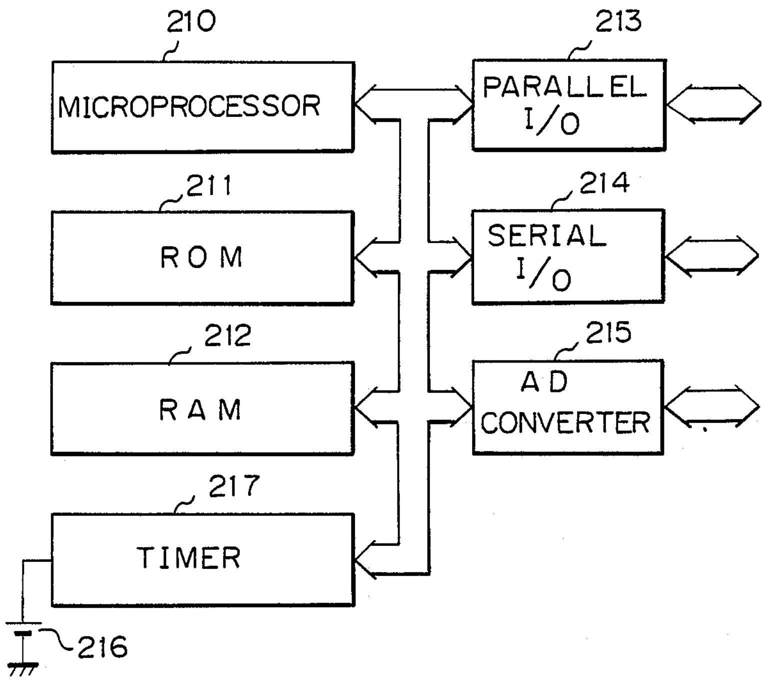
FIG. 4 is a schematic block diagram showing a main control section.

Referring to FIG. 4, a main controller installed in the image processor section 200 includes a microprocessor 210, a read only memory (ROM) 211, a random access memory (RAM) 212, a parallel input/output (I/O) port 213, a serial I/O port 214, an AD converter 215, and a bus line 218 connecting them to each other. Also included in the main controller is a timer 217 which is backed up by a battery 216.

Figure 5:
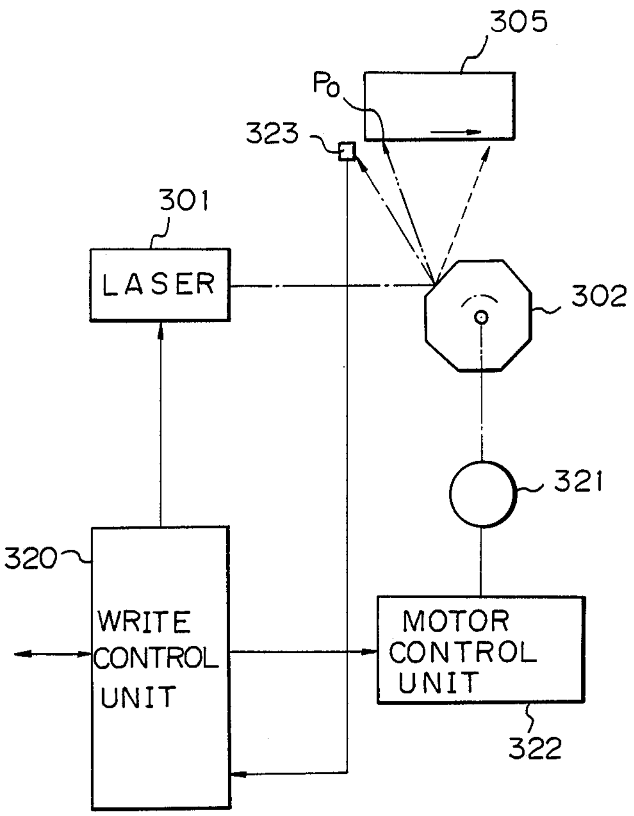
FIG. 5 is a schematic plan view of a writing section.
Figure 6:
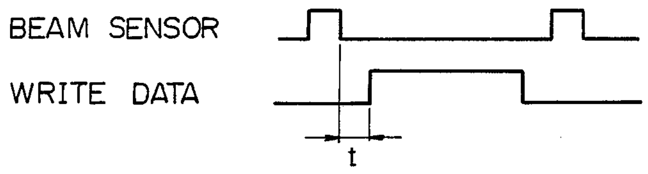
FIG. 6 is a timing chart.

FIG. 5 shows a write unit which is built in the printer section 300. As shown, the write unit includes a write control unit 320 and functions to control the semiconductor laser 301 and a motor control unit 322 which controls a motor 321 for driving the polygonal mirror 302. The polygonal mirror 302 is driven in a rotary motion by the motor 321 at a high speed of, for example, 14173 r.p.m to cause the laser beam from the semiconductor laser 301 to scan the photoconductive element 305 in the main scanning direction. A beam sensor 323 is located at one end of the horizontal scanning line of the photoconductive element 305 for the purpose of generating a signal which regulates a position $P_0$ where the laser beam should start writing data on the photoconductive element 305. Specifically, as shown in FIG. 6, the write start position $P_0$ is a position where a period of time $t_1$ expires after the beam sensor 323 has sensed the laser beam. From the position $P_0$, the semiconductor laser 301 whose output is 5 milliwatts is on-off controlled in response to write data so that a beam associated with a document image is intermittently incident to the photoconductive element 305 to form an electrostatic latent image. This is followed by an ordinary electrophotographic process for the development of the latent image, transfer of the resulting toner image, etc.

Figure 7:
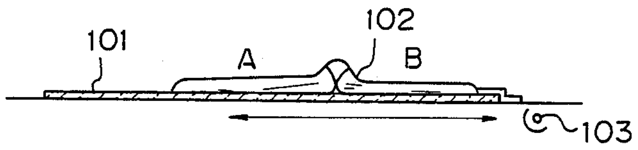
FIG. 7 is a schematic side elevation showing how a document is read.
Figure 8:
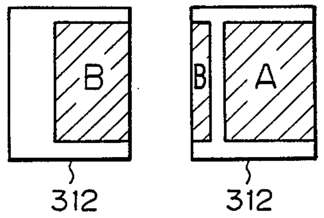
Fig. 8 PRIOR ART
FIGS. 8 and 9 are plan views showing respectively copies reproduced by a prior art method and those produced by the method of the present invention.

The continuous plural page copy mode operation to which the present invention pertains will be described in detail. The copying operation itself is implemented by the lamp 103 and the like which scans the underside of the glass platen 101 on which the document 102 is laid as indicated by an arrow, as shown in FIG. 7. The document 102 is held in a spread position. An image on one page of the spread documention 102 and an image on the other page of the same will hereinafter be referred to as images A and B, respectively. A drawback with the prior art continuous copying method of the kind described is that, since the leading read position of optics is fixed for each of various sizes of papers 312, the two pages fail to be accurately reproduced one on one paper and the other on another paper depending upon the document 102. For example, as shown in FIG. 8, the prior art method causes a part of the image B to be transferred to one paper 312 together with the image A or causes the image B to be partly lost.

Figure 9:
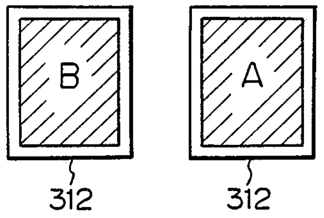

In the illustrative embodiment, not only the size of a document 102 but also the orientation of the document 102 are sensed while, at the same time, the size of papers 312 selected is determined. Based on these data, a read position of the optics in the continuous plural page copy mode is selected. Such a procedure allows the images A and B to be individually transferred to independent papers 312 with accuracy, as shown in FIG. 9.

Figure 10A:
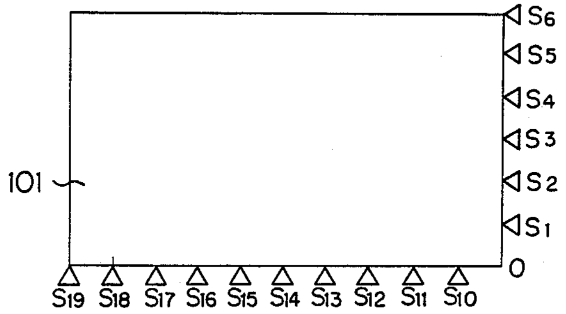
FIGS. 10A to 10D are schematic views explanatory of the detection of a document size.
Figure 10B:
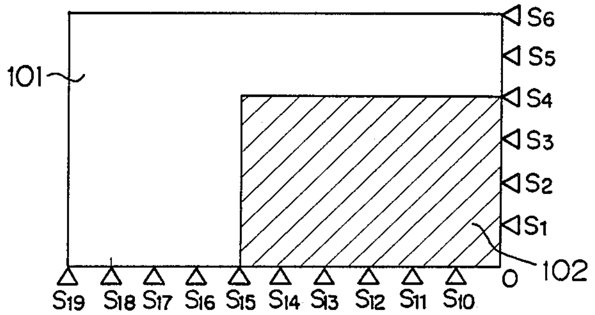
Figure 10C:
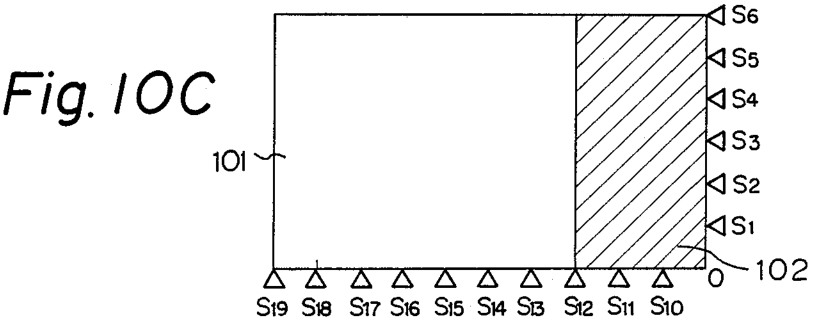
Figure 10D:
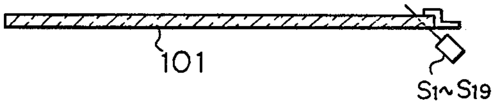

Referring to FIGS. 10A to 10D, a specific construction of means for sensing the size of a document is shown. As shown in FIGS. 10A to 10C, multiple document sensors such as six sensors $S_1$ to $S_6$ are sequentially arranged at equally spaced locations along the width of the glass platen 101 (i.e. in the main scanning direction), the sensor $S_1$ being positioned closest to a reference point O. Multiple document sensors such as ten sensors $S_{10}$ to $S_{19}$ are sequentially arranged at equally spaced locations along the length of the glass platen 101 (i.e. in the subscanning direction), the sensor $S_{10}$ being positioned closest to the reference point O. As shown in FIG. 10D, each of the sensors $S_1$ to $S_{19}$ comprises a reflection type photosensor which is located below the glass platen 101 in such a manner as to face a document 102. In a portion of the glas platen 101 where a document 102 is present, light issuing from any of the document sensors $S_1$ will be reflected by the document 102 to return to the sensors; in a portion where the document 102 is absent, the light will not be returned. It is therefore possible to determine not only the size of a document 102 loaded on the glass platen 101 but also the orientation of the document 102, i.e., whether its lengthwise direction of the document is parallel to the subscanning direction or to the main scanning direction by combining the outputs of the document sensors $S_1$ to $S_6$ and those of the document sensors $S_{10}$ to $S_{19}$.

The principle stated above will be discussed in relation to a simple specific example. In FIGS. 10A to 10C, assume that the document sensor $S_1$ to $S_{19}$ are located at intervals of 50 millimeters. For example, when a document 102 of a particular size as shown in FIG. 10B is laid on the glass platen 101 and sensed by the sensors $S_1$ to $S_4$ and the sensors $S_{10}$ to $S_{15}$, it is determined that the document 102 is dimensioned 200 millimeters in the vertical direction and 300 millimeters in the horizontal direction and that it is oriented horizontally long (i.e. in the subscanning direction). Such an orientation is appropriate for usual continuous plural page copying. To continuously copy the opposite pages of the document 102 which is oriented as shown in FIG. 10B, the whole length of the document 102 is allocated to two independent papers 312 and, therefore, the scanning operation of the scanner is divided into two. Specifically, the first scanning covers the distance between the reference point O and the sensor $S_{12}$ which is one half of the lengthwise dimension of the document 102, and the second scanning covers the distance between the sensors $S_{12}$ and $S_{15}$ which is the other half of the same.

Assume that a document 102 is loaded on the glass platen 101 as shown in FIG. 10C and therefore sensed by the sensors $S_1$ to $S_6$ and the sensors $S_{10}$ to $S_{12}$. Then, the outputs of those sensors show that a document 102 is dimensioned 300 millimeters in the vertical direction and 150 millimeters in the horizontal direction and that it is oriented vertically long (long in the main scanning direction). In this case, the whole length of the document 102 is allocated to two independent papers 312 and therefore the reading opertion in the main scanning direction is divided into two. Specifically, the distance between the reference point O and the sensor $S_3$ which is one half of the length of the document 102 is valid for the first scanning, and the distance between the sensor $S_3$ and $S_6$ which is the other half of the same is valid for the second scanning.

Figure 11:
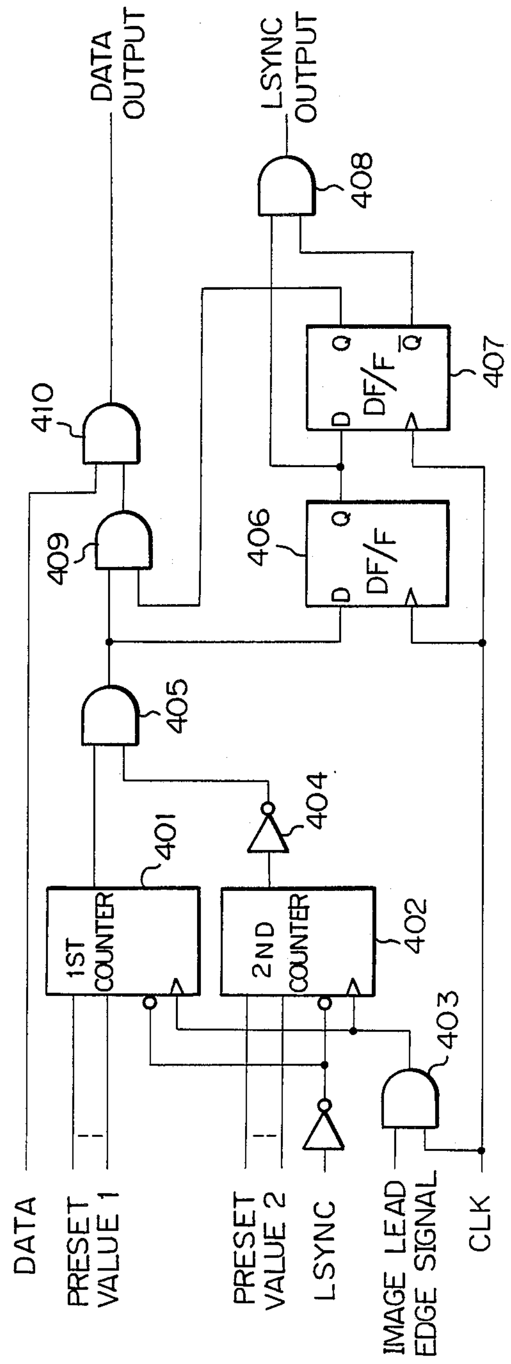
FIG. 11 is a block diagram showing a circuit for a continuous plural page copy mode which is associated with the main scanning direction.

Referring to FIG. 11, there is shown a circuit for implementing the continuous copy mode even when the document 102 is oriented vertically long as discussed above with refeence to FIG. 10C. As shown, the circuit includes a first counter 401 which is loaded with a preset 1 which is representative of a position where an image begins in the main scanning direction, and a second counter 402 loaded with a present value 2 which is representative of a position where the image ends in the main scanning direction. A main scanning sync signal LSYNC is applied to the first and second counters 401 and 402. Applied to clock terminals of the counters 401 and 402 is an output of an AND gate 403 which is adapted to reset the counters 401 and 402 by an image lead edge signal, which is synchronous to a clock signal CLK. An output of the counter 401 and an output of the counter 402 which is inverted by an inverter 404 are delivered to an AND gate 405. Flip-flops 406 and 407 are provided in two consecutive stages and each receives an output of the AND gate 405 at its D terminal and the clock signal CLK at its clock terminal. A Q output of the D flip-flop 406 and a $\overline{Q}$ output of the D flip-flopy 407 are fed to an AND gate 408 to produce a sync signal LSYNC. A Q output of the flip-flop 407 and an output of the AND gate 405 are delivered to an AND gate 409 whose output or F gate signal is in turn fed to an AND gate 410 together with image data. Consequently, the AND gate 410 produces bisected data for reproducing opposite pages of the vertically long document in a continuous copy mode. The F gate signal therefore is used to limit the valid range of data in the main scanning direction.

Figure 12:
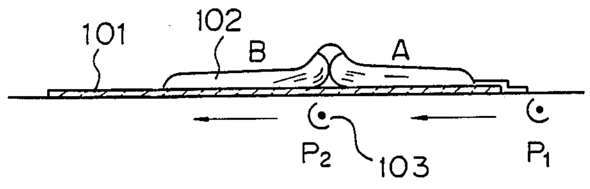
FIG. 12 is a schematic side elevation showing how a horizontally long document is read.
Figure 13:
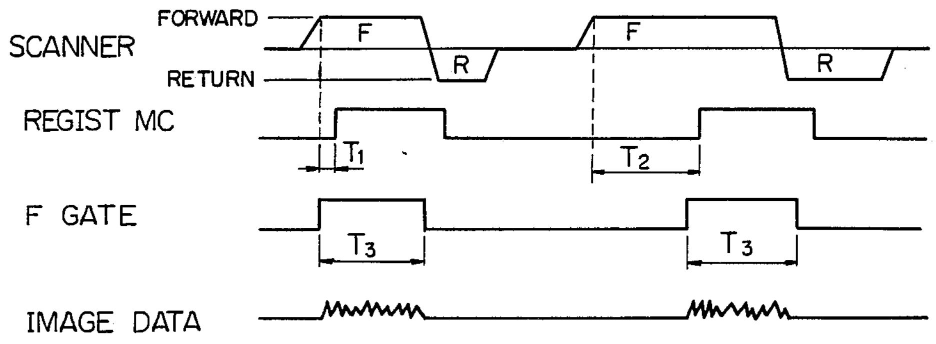
FIG. 13 is a timing chart.
Figures 1, 14A:
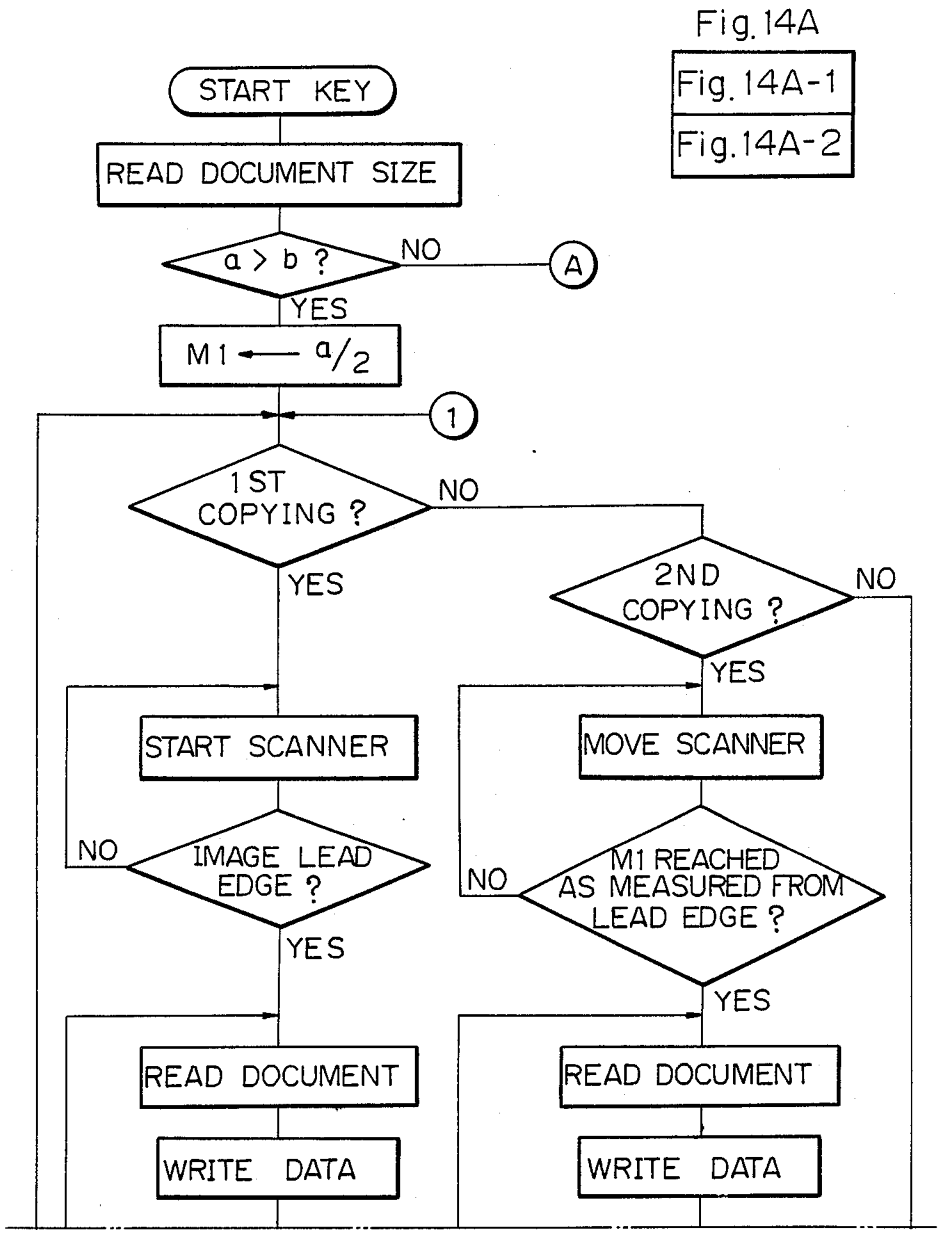
FIGS. 14A and 14B are flowcharts.
Figures 2, 14A:
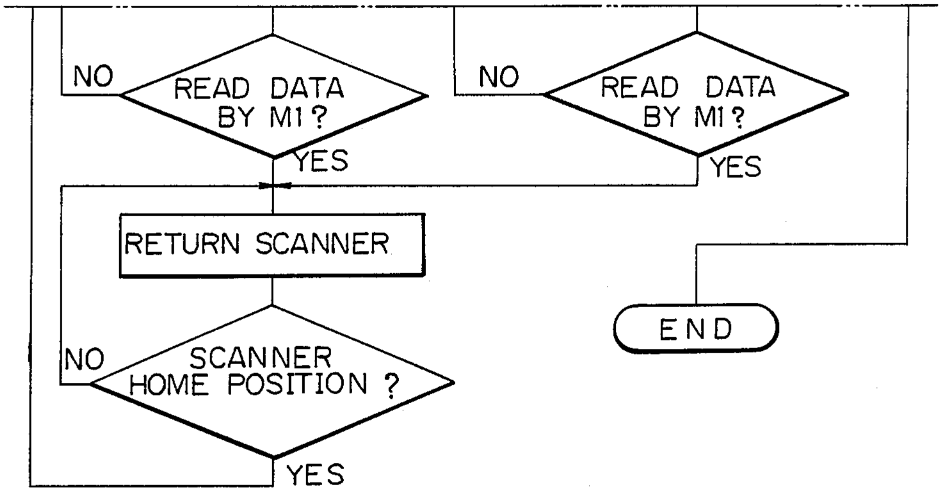
Figure 14B:
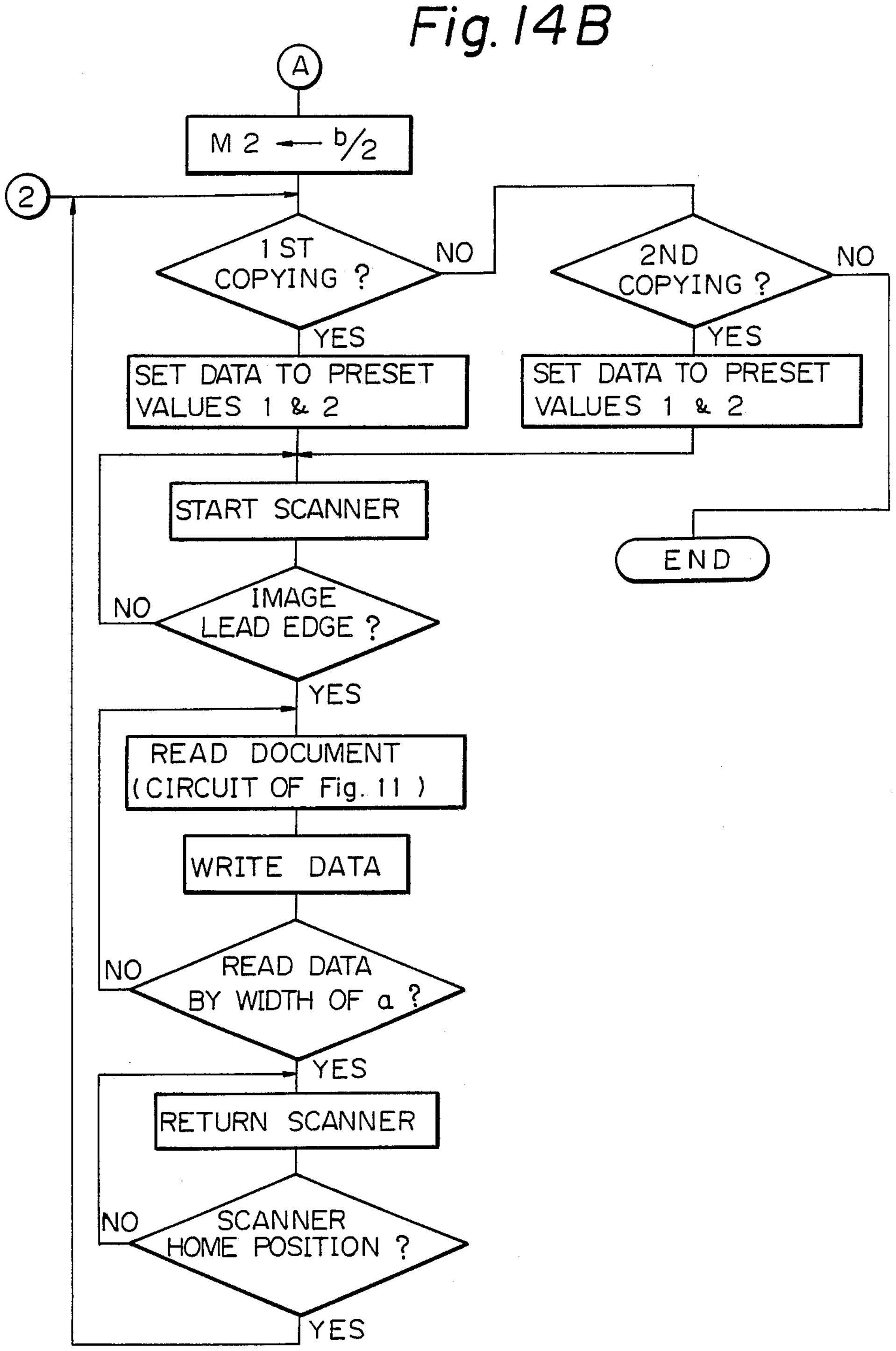

A reference will be made to FIGS. 12 and 13 for describing the continuous copy mode which is applied to the horizontally long orientation of FIG. 10B. FIG. 12 shows a physical relationship between the document 102 and the optics (lamp 103). In FIG. 12, $P_1$ and $P_2$ are respectively representative of a position for starting the first scanning associated with the image A and a position for starting the second scanning associated with the image B. FIG. 13 is a timing chart showing the movement of the scanner (lamp 103 etc.), the operation of an electromagnetic clutch for resignation, the F gate signal, and the image data. The operation will be described with reference also made to FIGS. 14A and 14B.

First, the size of the document 101 laid on the glass platen 101 is read by the document sensors S and then converted into dimension data. Among the dimensions read, the horizontal dimension a read by the sensors $S_{10}$ to $S_{19}$ and the vertical dimension b read by the sensors $S_1$ and $S_6$ are stored in a memory. Subsequently, the dimensions a and b are compared to determine the orientation of the document 102 on the glass platen 101. Here, the dimension a is greater than the dimension b and, therefore, it is halved to produce half size data a/2 of the document 102. This half size data a/2 is stored in a memory M1. Then, a first copy flag is set. Since the document 102 is to be read twice in this particular mode, the control system checks the first copy flag to see if it is the first copying that is to be performed. Here, the first reading operation is executed. To begin with, the scanner is driven toward the position where the leading edge of an image is located (in FIG. 13 indicated by forward or F) and, upon arrival at such a position, caused to start reading the image. Data read out is fed to the printer section 300 to be printed out on a paper 312. This is delayed by a feed timing of the paper 312, i.e., operation timing $T_1$ of the electromagnetic clutch. Whether the reading operation has advanced to a position corresponding to the dimension a/2 is determined by seeing if an amount of data corresponding to the memory M1 have been read. If the answer is positive, the first copying operation is terminated, and the scanner is returned (in FIG. 13, indicated by return or R) to the home position. At this time, the first copy flag is cleared while, at the same time, a second copy flag is set.

Hence, as soon as the return of the scanner to its home position is sensed, the second copying operation for reproducing the image B of FIG. 12 is started. The actual position where the image B is to be read by the second operation is $P_2$ and, hence, the scanner is advanced by a distance which is equal to one half of the lengthwise dimension of the document, i.e. a/2 stored in the memory M1. As the scanner reaches the position $P_2$, a reading operation of the second copying begins so that the image B in the other half of the document 102 is read and printed out. While such reading and printing operations are the same as those of the first copying, the feed of a paper 312 will be delayed by $T_2$ as viewed from the leading edge of th document 102 because image reading begins at the position $P_2$ this time. The images A and B are each read during a period of time of $T_3$. Upon completion of the second copying, both the first copy flag and the second copy flag are cleared to end the continuous plural page copy mode operation.

Figure 15:
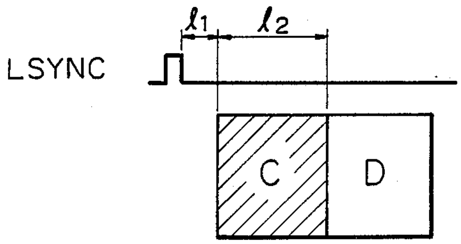
FIG. 15 is a schematic view representative of an operation for reading a vertically long document.

How the continuous plural page copy mode is executed with the document orientation shown in FIG. 10C will be described. Assume that the document 102 of FIG. 10C carries images C and D which are divided from each other in the main scanning direction as previously stated. In this case, the circuit shown in FIG. 11 is used. As shown in FIG. 15, assume that the length between the point where a sync signal LSYNC appears and the point where the leading edge of the document 102 is positioned is $l_1$, and the length of one half of the total area of the document 102 which should be actually copied, e.g., C image region is $l_2$ (=b/2). Then, it is preferable to select the preset values 1 and 2 of the first and second counters 401 and 402 to be $l_1$/PLS and ($l_1+l_2$)/PLS, respectively, where PLS is representative of a certain fixed value.

Figure 16:
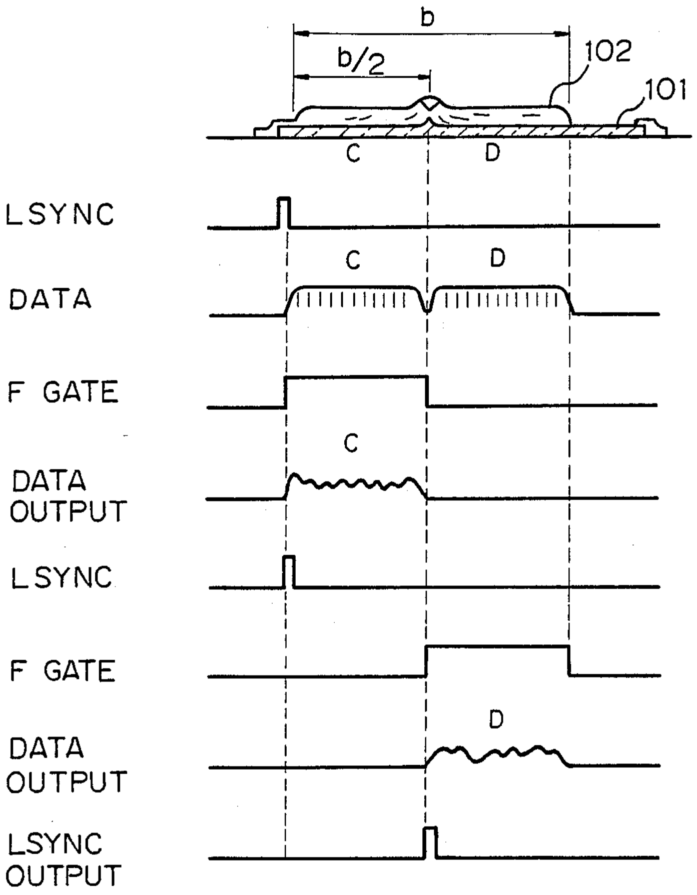
FIG. 16 is a timing chart.
Figure 17:
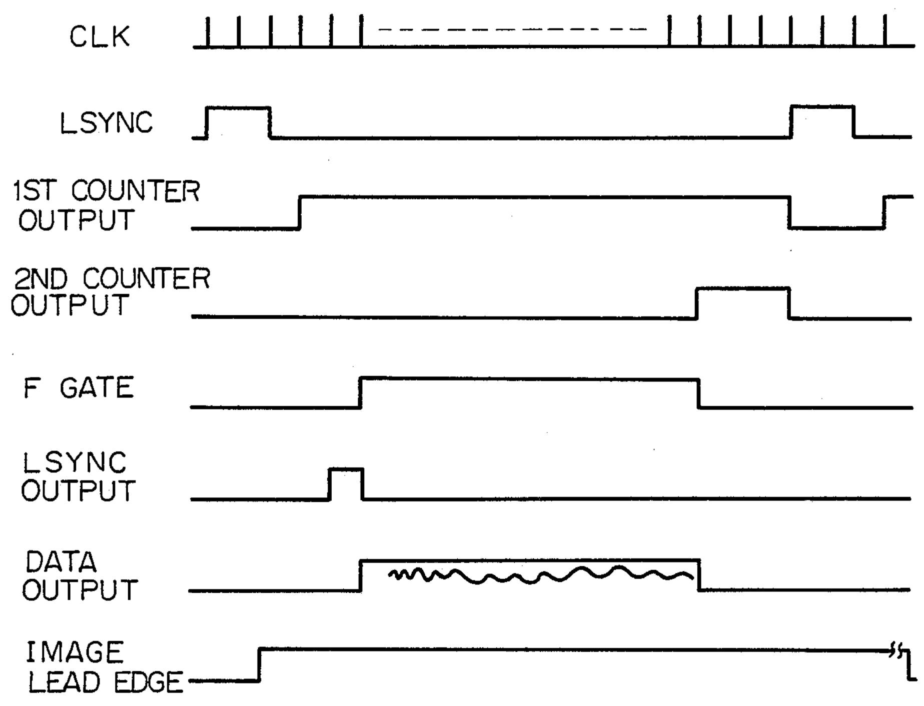
FIG. 17 is a timing chart.

When b is greater than a as determined by the comparison of the dimensions of the document 102, the vertical dimension or length b is halved to produce a half size b/2. This data b/2 is stored in a memory M2, and then the first copy flag is set. Before the actual copying operation begins, the first and second counters 401 and 402 are respectively loaded with the preset values 1 and 2 which are $l_1$/PLS and ($l_1$+document width)/PLS=($l_1$+M2)/PLS, respectively. The fixed value PLS may be, but not limited to, "8". In this condition, the scanner is advanced to the position where the leading edge of the image is located. Then ,the circuit of FIG. 11 is operated to read the document image. Specifically, the first and second counters 401 and 402 are respectively loaded with the preset values 1 and 2 in response to the sync signal LSYNC and then started to operated in response to a image lead edge sense signal. The counters 401 and 402 each produces an output when the preset value associated therewith is reached. Such a procedure is shown in timing charts in FIGS. 16 and 17. Specifically, with the preset values 1 and 2 it is possible to determine which part of the document images should be extracted on the basis of the sync signal LYSNC, i.e., only one half of the images which lie in the main scanning direction is determined valid. Data associated with the image C which is read as stated above are fed to and printed out by the printer section 300. As such an operation proceeds, whether data have been read over the width a of the document, i.e., length in the subscanning direction has been completed is determined. If the answer is positive, the scanner is returned to start the second copying operation. At this time, the first copy flag is cleared and the second copy flag is set. As soon as the return of the scanner to its home position is sensed, the second copying operation is started. In this case, too, the counters 401 and 402 are loaded with the preset values 1 and 2, respectively. Since it is the image D lying in the other half of the document 102 that should be read, the preset values 1 and 2 are selected to be ($l_1$+M2)/PLS and ($l_1$+b), respectively. While the document 102 is read in this condition, only those data which are associated with the image D are determined valid and outputted to be printed out. In this manner, even when the document 102 is oriented vertically long parallel to the main scanning direction, the two pages thereof can be reproduced on independent papers in a continuous manner.

Figure 18A:
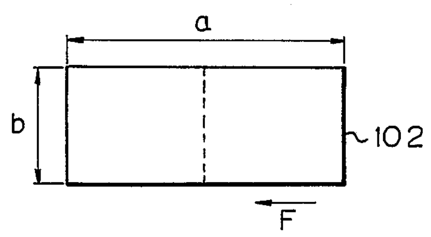
FIGS. 18A and 18B are plan views of a document and a paper, respectively.
Figure 18B:
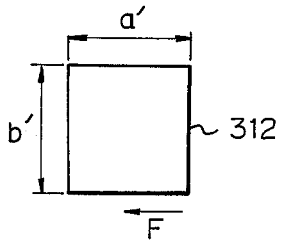
Figure 19:
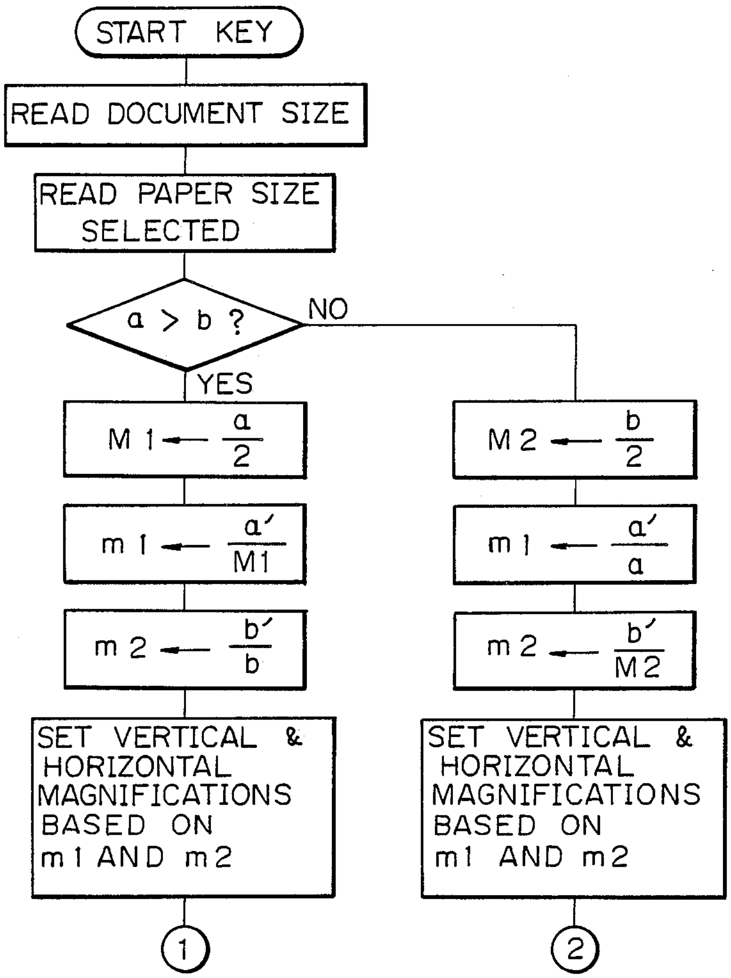
FIG. 19 is a flowchart.

In the description made so far, one half of the size of a document and the size of papers are the same as each other. In practice, however, the size of papers 312 selected may differ from one half of the size of a document 102, as shown in FIGS. 18A and 18B. In FIGS. 18A and 18B, a/2 is not equal to a' and b is not equal to b'. In the illustrative embodiment, the operation shown in FIG. 19 is executed to change the magnification in conformity to the half size of the document and the paper size, so that reproduced images just match with the size of papers selected. In FIGS. 18A and 18B, an arrow F is representative of a direction in which the document 102 is scanned and a direction in which the paper 312 is transported.

First, as in the previously stated case, the document size and the paper size selected are read. The paper size which is selected by an operator is sensed in terms of the size of a cassette or the like. Based on the document size and paper size read, the data a and b associated with the document 102 and the data a' and b' associated with the papers 312 are produced. The data a and b are compared to determine the orientation of the document 102 on the glass platen 101 and, if a is greater than b, it is decided that the document 102 is oriented horizontally long, i.e., parallel to the subscanning direction. Then, half size data a/2 is stored in the memory M1. To determine a magnification change ratio m1 in the horizontal direction, a'/M1 is performed. At the same time, a magnification change ratio m2 in the vertical direction is determined by performing b'/b. Consequently, magnifications in the horizontal and vertical directions are produced and fed to the magnification change unit. This is followed by actual reading and copying operations as previously described with reference to FIG. 14.

The magnification change ratio m1 in the horizontal direction, i.e., feed direction is as follows. For example, assume that the document 102 is of size A3 ($a\times b$=420 millimeters$\times$297 millimeters) and the papers 312 are of size B5 ($a'\times b'$=182 millimeters$\times$257 millimeters). Then, one half of the document size is expressed as $a/2\times b$=210 millimeters$\times$297 millimeters. It follows that an image having such a size may be reproduced on a B5 paper by changing 210 millimeters to 182 millimeters (=0.867 magnification) and 297 millimeters to 257 millimeters (=0.865 magnification). Further, assuming a document 102 having the same size as stated above and papers 312 of size B4, all that is required is changing 210 millimeters to 364 millimeters (=0.73 magnification) and 297 millimeters to 257 millimeters (0.865 magnification).

The principle of magnification setting stated above is also true with a case wherein the document 102 is oriented such that a is smaller than b. In such a case, since the lengthwise dimension is b, data b/2 is stored in the memory M2, the magification change ratio m1 in the horizontal direction is calculated by a/a', and the magnification change ratio m2 in the vertical direction is calculated by b'/M2.

If desired, the independent vertical and horizontal magnification setting procedure described above may be replaced with a procedure in which a magnification is selected by switches or the like on the basis of one of the vertical and horizontal dimensions. Further, in the case of reduction, the magnification may be changed on the basis of the reduction ratio of one of the vertical and horizontal dimensions which is to be reduced more than the other while, in the case of enlargement, it may be changed on the basis of the enlargement ratio of one of the vertical and horizontal dimensions which to be enlarged less than the other. This allows an image to be accommodated in a paper 312 without the ratio of the longitudinal and lateral dimensions of characters and the like being charged.

Figure 20A:
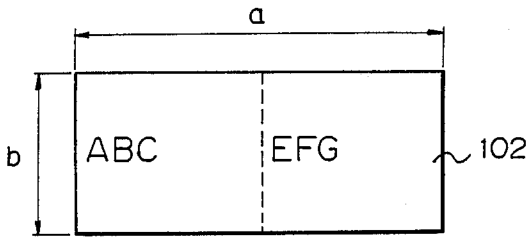
FIGS. 20A and 20B are plan views of a document and papers, respectively.
Figure 20B:
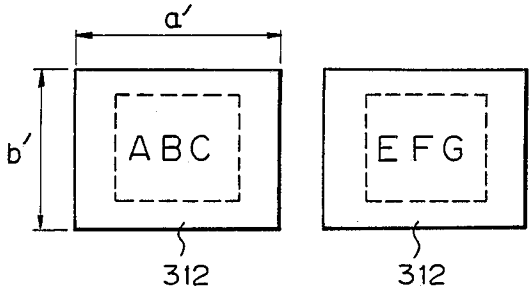
Figures 1, 21A:
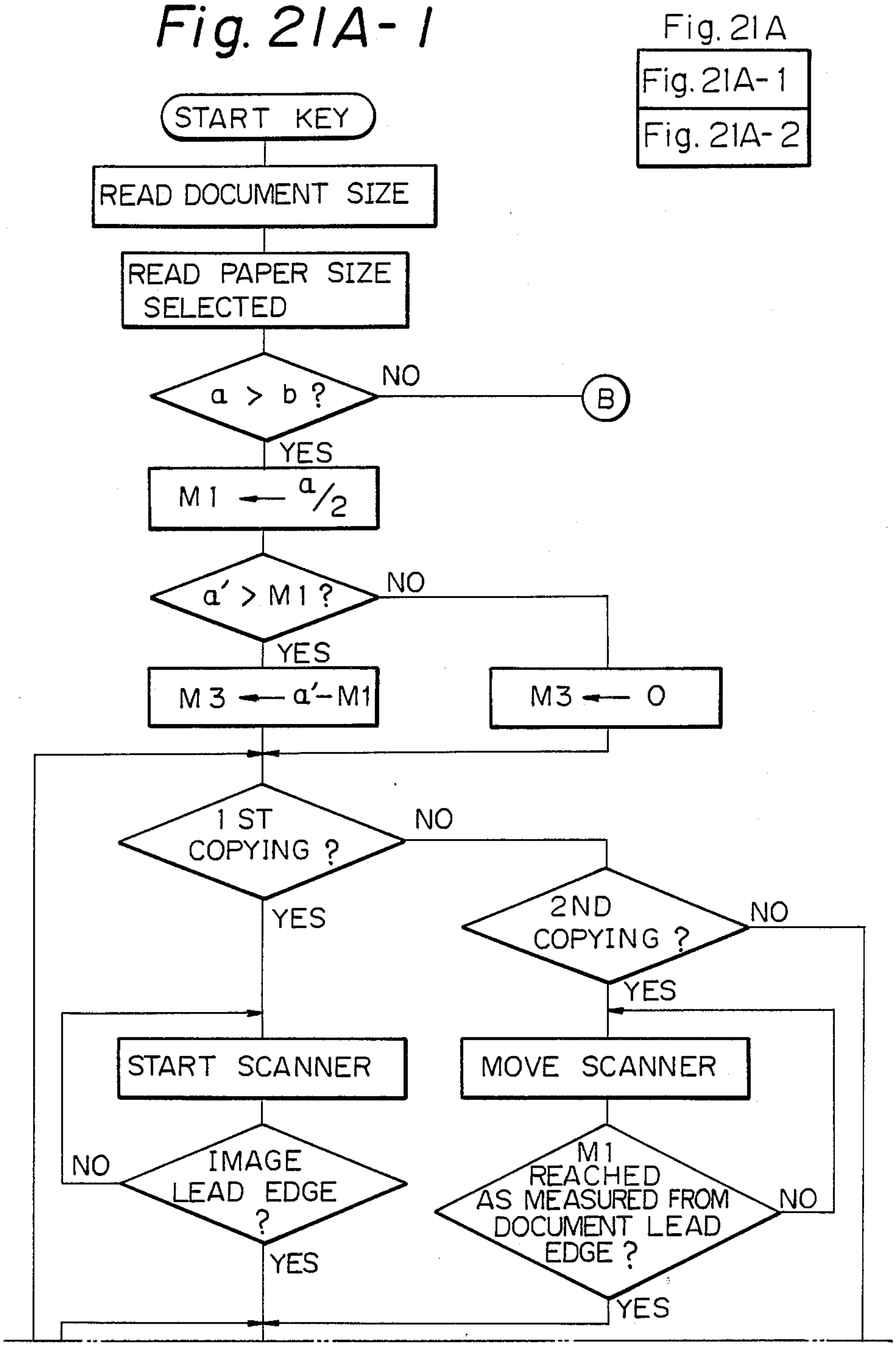
FIGS. 21A and 21B are flowcharts.
Figures 2, 21A:
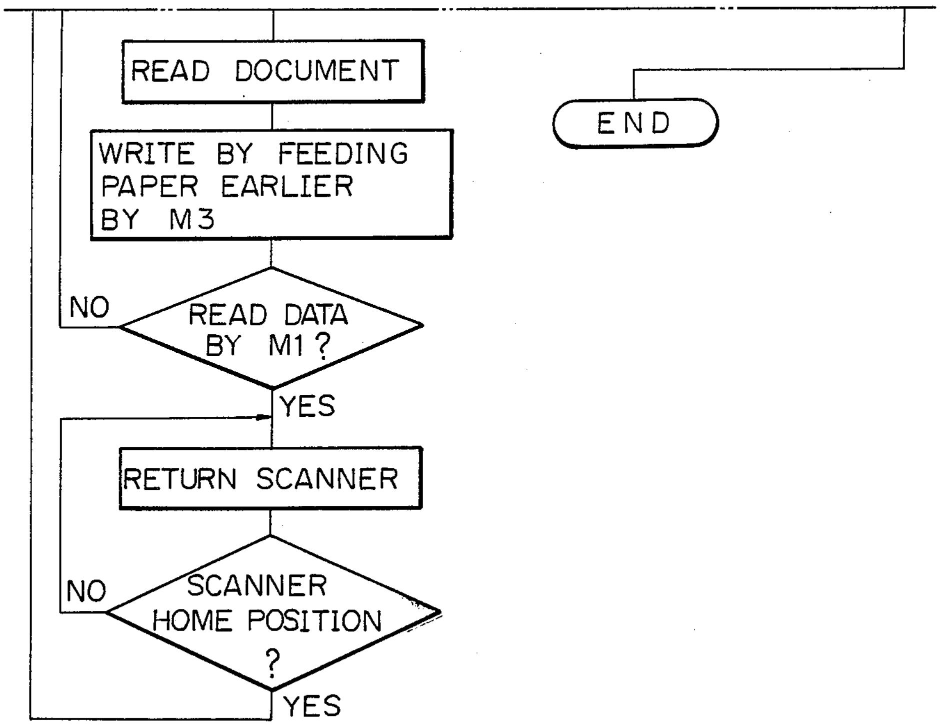
Figures 1, 21B:
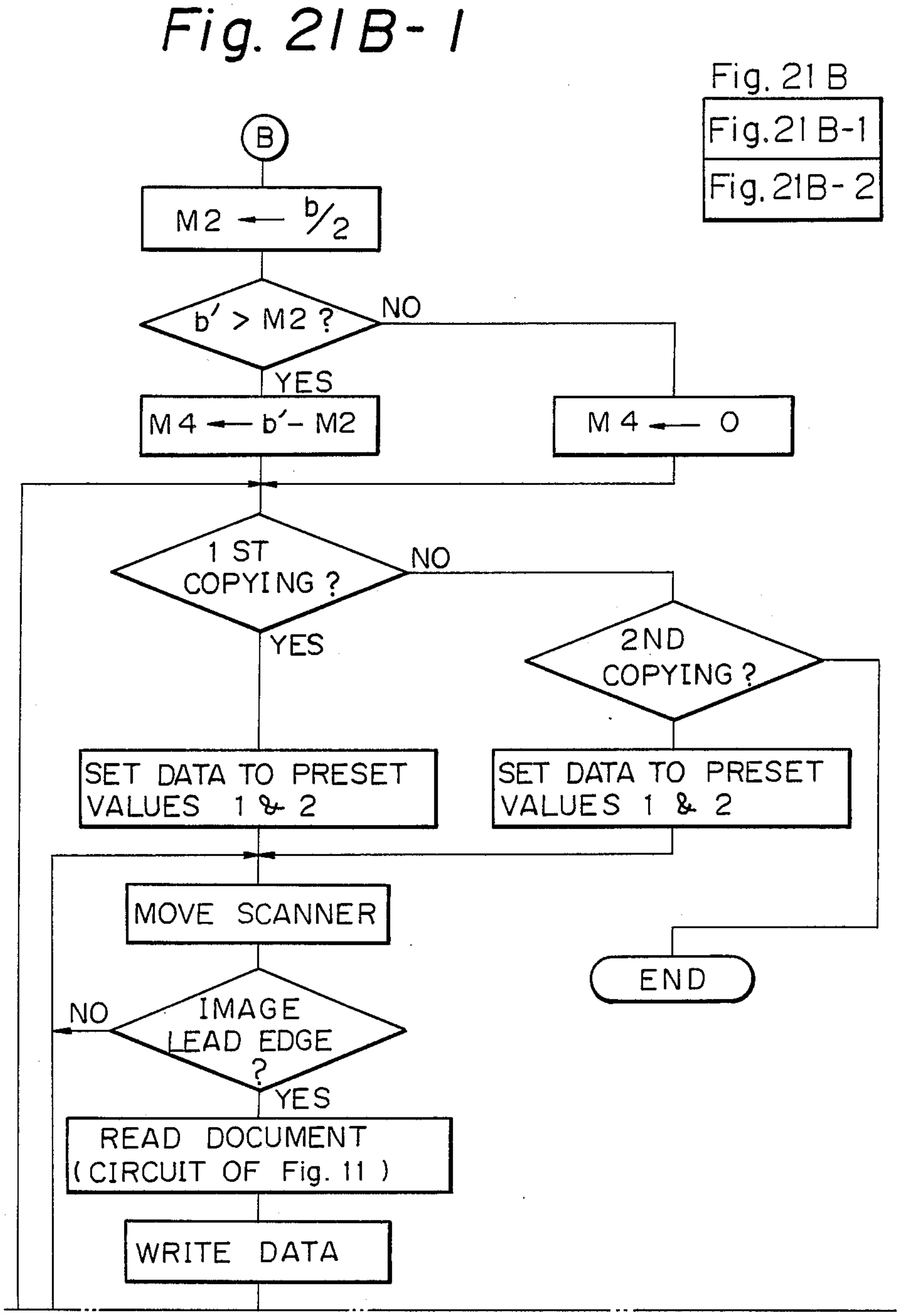
Figures 2, 21B:
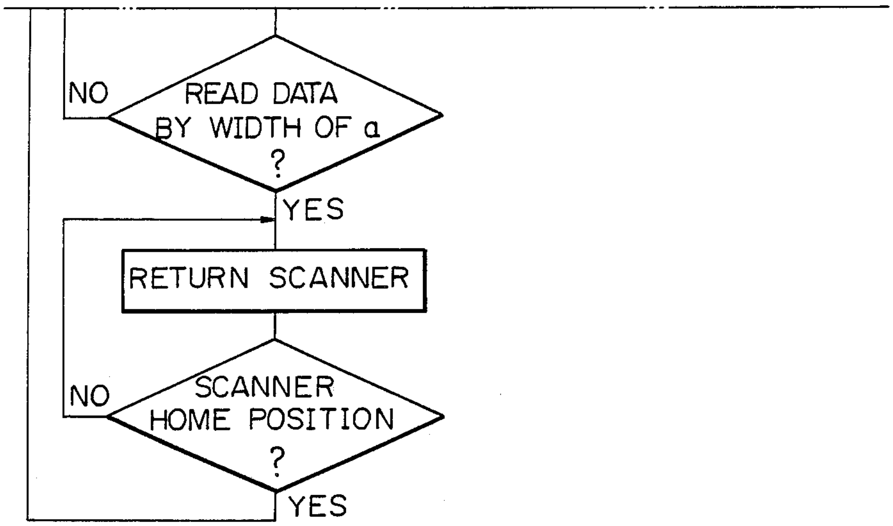

When the paper 312 has a greater size than the document 102, an image is carried on the paper 312 by the following procedure. FIGS. 20A and 20B show a specific example in which images "ABC" and "EFG" of a document 102 are each reproduced at the center of a different paper 312. FIGS. 21A and 21B are flowcharts demonstarting a procedure for implementing such a manner of reproduction. The procedure begins with reading the size of the document 102 and that of the papers 312 selected, as in the previous case. Then, which of the vertical dimension b and horizontal dimension a of the document 102 is greater is determined. If a is greater than b, data a/2 is stored in the memory M1. Thereafter, which of the half size a/2 of the document 102 and the size a' of the papers 312 is greater is determined and, if a' is greater than a/2, the difference a'−M1 is stored in a memory M3. This memory M3 indicates an amount by which the registration timing should be advanced for centering images on papers, specifically $M3=a'-M1=a'-(a/2)$. If a' is smaller than a/2, centering and therefore registration timing adjustment is not needed and so the memory M1 is loaded with zero. Subsequently, the first copying operation is performed for one half of the document 102. While the first copying operation is generally similar to the previously described one, the paper registration timing is advanced by the above-mentioned amount M3 during printing which occurs in parallel to image reading. As a result, the images of the document 102 are centered on the papers 312, as shown in FIGS. 20A and 20B. When the scanner operation reaches M1, the scanner is returned as in the previous case to prepare for the second copying operation. The second copying operation is essentially the same as the first one except that reading and printing begin after the scanner has been moved halfway in the subscanning direction by the amount M1. In this case, too, the paper registration timing is advanced by M3 to center the images on the papers.

Assume a case wherein a is greater than b and the document 102 is wider in the main scanning direction than in the subscanning direction. Data b/2 representative of the half size in the lengthwise direction is stored in the memory M2, and then the data b/2 is compared with a paper size b'. If b' is greater than b/2, M2 is subtracted from b' to produce an amount by which the images should be shifted in the main scanning direction. The difference b'−M2 is stored in a memory M4. If b' is smaller than b/2, centering is not needed and so the memory M4 is loaded with zero. Again, the first and second copying operations which follow the above procedure are executed on the basis of preset values. The difference is the shift of imagesd in the main scanning direction. The processing for shifting images so is performed by the printer section 300 with the scanner and the like being operated in the same manner as in the previous case.

Figure 22:
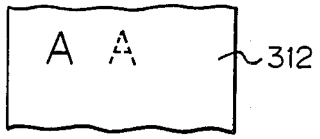
FIG. 22 is a plan view of a paper.
Figure 23:
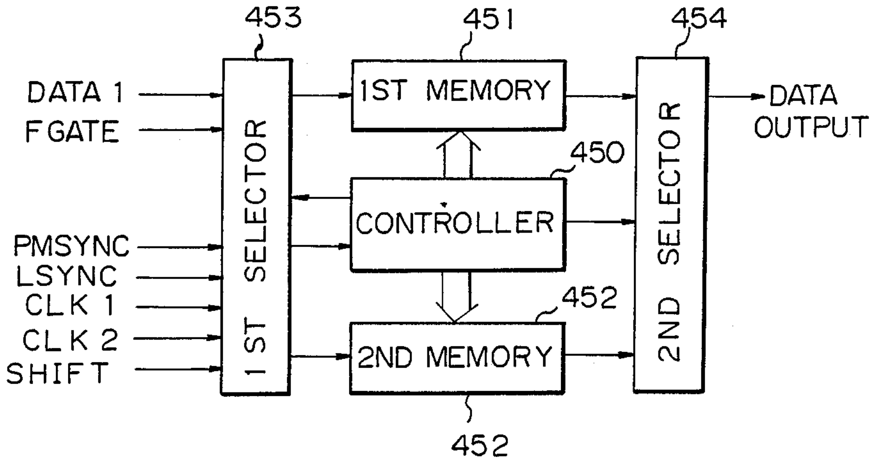
FIG. 23 is block diagram.

The shift of images in the main scanning direction which is performed by the printer section 300 is as follows. As shown in FIG. 22, assume a case wherein an image "A" indicated by a solid line is to be shifted to a position which is indicated by a phantom line. FIG. 23 shows a circuit for effecting such a shift. In FIG. 23, a first memory 451 and a second memory 452 each being implemented as a 1-line buffer memory are controlled by controller 450. A first selector 453 and a second selector 454 are connected to the memories 451 and 452 and also controlled by the controller 450. Applied to the first 453 are DATA1, F gate, PMSYNC, LSYNC, CLK1, CLK2 snd shift signals. DATA1 is representative of an image signal which is read by the scanner. The F gate signal indicates a valid range (in the main scanning direction) of the DATA1 which are outputted by the AND gate 409. PMSYNC is representative of a reference signal for the write unit which is smaller to the signal derived from the beam sensor 323. LSYNC is a reference signal for the reading section which is produced on the basis of PMSYNC. Further, CLK1 is a clock signal for clocking the CCD image sensor 108, and CLK2 is a clock signal for clocking the semiconductor laser 301. The two buffer memories 451 and 452 are switched from one to the other line by line and, hence, the clock signals CLK1 and CLK2 do not have to be the same as each other.

Figure 24:
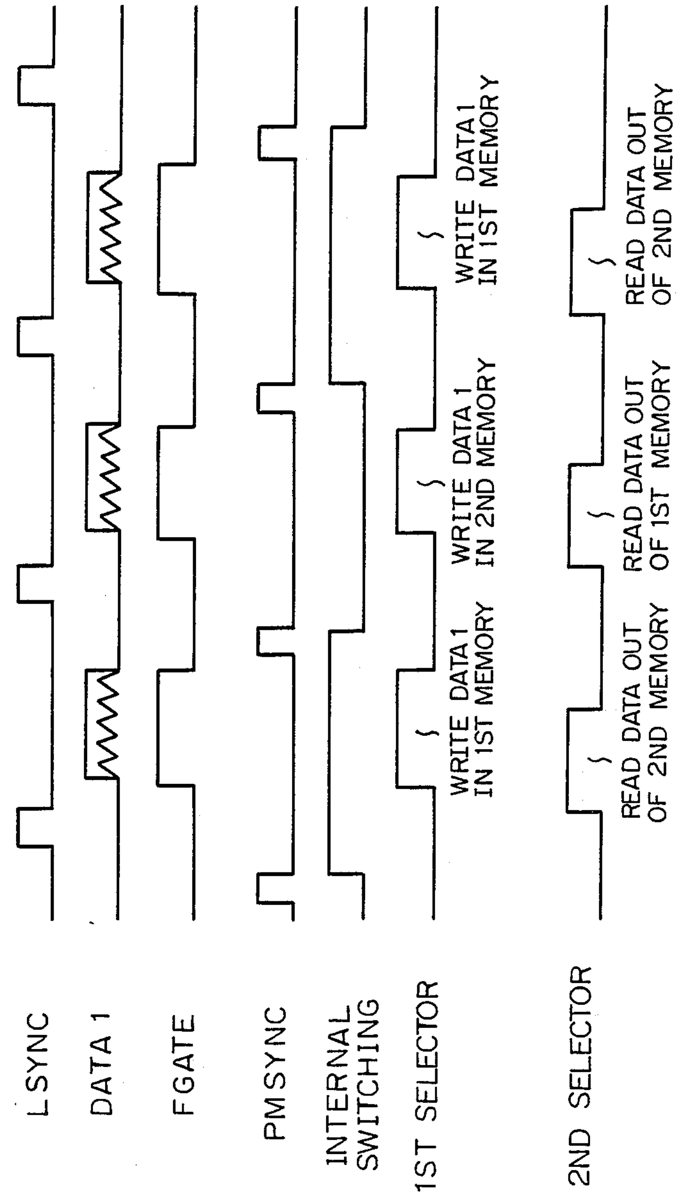
FIG. 24 is a timing chart.

The operation of the circuit shown in FIG. 23 will be described with reference to the timing chart of FIG. 24. When an internal switching signal is (logical) ONE, DATA 1 is stored in the first memory 451 in synchronism with CLK1. At the same time, the content of the second memory 452 is read out in synchronism with CLK2 and delivered via the second selector 454. Upon arrival of the next PMSYNC, the internal switching signal becomes (logical) ZERO so that DATA 1 is stored in the second memory 452 timed to the CLK1. Simultaneously, the content of the first memory 451 is read out in synchronism with CLK2. Such a toggle operation is repeated thereafter every time the logical level of the internal switching signal is changed in response to PMSYNC. In this manner, in the circuit of FIG. 23, writing data in the first and second memories 451 and 452 and reading data out of the second and first memories 452 and 451 occur in synchronism with different clock signals.

The relationship between PMSYNC, CLK2 and DATA is as follows. As shown in FIG. 5, the beam sensor 323 for generating PMSYNC is located outside the image forming region of the photoconductive element 305, and the laser beam arrives at the reference point $P_0$ on the photoconductive element 305 when a period of time $t_1$ expires after the laser beam has been incident to the beam sensor 323. Assuming that the position $P_0$ defines the origin for writing, image data will be printed out from the edge portion of the paper 312 if they are outputted upon the lapse of the period of time $t_1$ after the beam sensor 323 has sensed the laser beam. Therefore, when images should be shifted to the right (toward the center) on the paper 312 as shown in FIG. 22, the image data will be outputted to be written on the photoconductive element 305 when a period of time $(t_1+\alpha)$ expires after the beam sensor 323 has sensed the laser beam. It is the shift signal applied to the first selector 453 that controls such a delay $\alpha$ in timing. Specifically, in the flowchart of FIG. 21, an image is shifted by a width of M4 by applying a value of M4/CLK2 to a shift terminal of the first selector 453. This delays the clock by M4/CLK2 and thereby shifts the image toward the center of the paper 312.

In summary, it will be seen that the present invention allows a plurality of pages of a document laid on a glass to be copied continuously with no regard to the orientation of the document relative to the scanning direction of a scanner. This frees an operator from severe mental burden with regard to the orientation of a document, matches the size of a reproduction to the size of papers selected, and promotes efficient manipulation for the continuous plural page copy mode.

Various modifications will become possible for those skilled in the art after receiving the teachings of the present disclosure without departing from the scope thereof.

What is claimed is:

1. A method of continuously printing a plurality of pages of a document for a copier, comprising the steps of:

(a) laying a document on a glass platen of the copier;

(b) reading a size of the document on the glass platen;

(c) determining a lengthwise direction of the document;

(d) calculating one half of the size of the document in the lengthwise direction determined to produce half size data;

(e) storing the half size data of the document in a memory;

(f) executing a reading operation for first copying;

(g) determining the end of the reading operation to a point which is associated with the half size data stored in the memory; and (h) executing a reading operation for second copying, whereby said documents can be laid in both a horizontal and vertical direction.

2. A method as claimed in claim 1, further comprising (i) reading a size of papers selected and (j) calculating magnifications in a vertical and a horizontal direction on the basis of the half size data and the size of the papers.

3. A method as claimed in claim 1, wherein reading the size of the document in step (b) and determining the lengthwise direction of the document in step (c) are effected by using a plurality of sensors which are arranged at equally spaced locations from a reference point of the glass platen in both of a main and a subscanning direction.

4. A method as claimed in claim 1, wherein the reading operations in steps (f) and (h) each comprises (i) moving a scanner to the leading edge of an image, (j) reading the image from the leading edge of the image, (k) outputting data read from the image to a printer section, and (l) printing out said data on paper.

* * * * *